United States Patent [19]
Jeffers

[11] Patent Number: 5,610,876
[45] Date of Patent: Mar. 11, 1997

[54] ACOUSTIC DETERRENT SYSTEM AND METHOD

[75] Inventor: Robert K. Jeffers, Welton, N.H.

[73] Assignee: Airmar Technology Corporation, Milford, N.H.

[21] Appl. No.: 564,327

[22] PCT Filed: Mar. 16, 1994

[86] PCT No.: PCT/US94/02833

§ 371 Date: Jan. 22, 1996

§ 102(e) Date: Jan. 22, 1996

[87] PCT Pub. No.: WO95/00016

PCT Pub. Date: Jan. 5, 1995

Related U.S. Application Data

[63] Continuation-in-part of Ser. No. 81,738, Jun. 22, 1993, abandoned.

[51] Int. Cl.$^6$ ............................................. A01M 29/02
[52] U.S. Cl. ............................................. 367/139
[58] Field of Search .......................... 367/139; 43/17.1, 43/124; 340/382.2; 116/22 A

[56] References Cited

U.S. PATENT DOCUMENTS

| | | | |
|---|---|---|---|
| 3,264,772 | 8/1966 | Hart | 43/4.5 |
| 3,307,285 | 3/1967 | Wells | 43/4.5 |
| 3,317,889 | 5/1967 | Barrand | 367/139 |
| 3,414,873 | 12/1968 | Richard et al. | 367/139 |
| 3,524,276 | 8/1970 | Thomas et al. | 43/4.5 |
| 3,872,472 | 3/1975 | Moschgat | 340/384 E |
| 4,556,010 | 12/1985 | Persson et al. | 116/22 R |
| 4,580,525 | 4/1986 | Marzluf | 119/3 |
| 4,593,648 | 6/1986 | Marzluf | 119/3 |
| 4,642,801 | 2/1987 | Perny | 367/88 |
| 4,646,276 | 2/1987 | Kowalewski et al. | 367/139 |
| 4,750,451 | 6/1988 | Smith | 119/3 |
| 4,825,810 | 5/1989 | Sharber | 119/3 |
| 4,922,468 | 5/1990 | Menezes | 367/139 |
| 4,932,007 | 6/1990 | Suomala | 367/139 |
| 4,933,918 | 6/1990 | Landsrath et al. | 367/139 |
| 4,955,005 | 9/1990 | Loeffelman | 367/139 |
| 5,117,572 | 6/1992 | Parra | 43/17.1 |
| 5,134,592 | 7/1992 | Parra | 367/139 |
| 5,214,619 | 5/1993 | Yoshida | 367/139 |

FOREIGN PATENT DOCUMENTS

WO90/01758  2/1990  WIPO.

OTHER PUBLICATIONS

Oregon State University Sea Grant document.

Primary Examiner—Daniel T. Pihulic
Attorney, Agent, or Firm—Hamilton, Brook, Smith & Reynolds, P.C.

[57] ABSTRACT

An acoustic system and a method for repelling marine mammals from a region of water is disclosed. A plurality of acoustic transducers (10,12,14,16) are spatially dispersed beneath the surface of the water. The transducers (10,12,14,16) in sequence output high frequency acoustic signals into the water. The power of the acoustic signals starts at a low level and is gradually or incrementally increased to a high level which produces a signal beyond the threshold of pain of the mammals to be repelled. The mammals are therefore gradually repelled from the area without suffering permanent hearing loss.

21 Claims, 9 Drawing Sheets

ACOUSTIC DETERRENT SYSTEM AND METHOD

RELATED APPLICATIONS

This application is a Continuation-in-Part (CIP) application of and claims priority to U.S. patent application Ser. No. 08/081,738, filed Jun. 22, 1993 now abandoned.

BACKGROUND OF THE INVENTION

At commercial and sport fish farms, interference from marine mammals such as seals and sea lions is a serious problem. The mammals prey on the fish kept in submerged fish pens, resulting in loss to the fish farms. Therefore, it is important to the fish farms to keep the mammals away from their fish pens.

Various methods of repelling marine mammals from fish farms have been employed with only minimal successes. A chemical "taste aversion" method has been used in which lithium chloride is injected into some of the fish. A mammal taking a dosed fish will become temporarily ill. Thus, a type of negative conditioning is used to keep the mammals away from the fish pens. Drawbacks to this approach are that it is not humane, and it can be hazardous if fish dosed with lithium chloride are inadvertently consumed by humans.

Most marine mammals have excellent hearing and the water in which they live is an efficient medium for transmitting sound. The transmission of underwater sounds as warnings or irritants has been considered a promising method of repelling marine mammals. One such acoustic deterrent method is introducing sounds of predators such as killer whales and gray whales into the water near the fish farms. This method has been shown to work for a while, but the animals soon learn that no predators are in the area and come back to the fish farms.

Explosives have also been used as an acoustic deterrent. Seal bombs are underwater explosives which produce a flash of light and a high amplitude sound. Cracker shells are airborne explosives which are shot from a shot gun over the heads of mammals in the water. Both explosive methods have been used with some degree of success. However, they are dangerous to handle and are also labor intensive in that a person must repeatedly interrupt his other duties at the fish farm or must be completely dedicated to the task of discharging the explosives. Also, the explosives emit acoustic signals at low frequency and are therefore not well matched to the sensitive portions of the mammals' hearing. The explosive devices can also cause loss of hearing in the mammals which is inhumane and also renders acoustic deterrence ineffective against the deaf mammals.

High frequency acoustic signals have also been used in acoustic deterrent systems as a deterrent to seals and sea lions. In these systems, the irritation works for a while to keep the mammals away from the fish pens. However, after some time, the mammals become conditioned to the sound. The desire for the fish overrides the irritation caused by the acoustic signals, and the mammals return to the pens to feed. In fact, it is believed that after prolonged use of these systems, the signals actually act to signify the presence of food and therefore attract the seals and sea lions to the fish pens.

U.S. Pat. No. 4,922,468 to Menezes describes a method and apparatus for controlling aquatic population in defined areas. In the Menezes system, various stimuli including acoustic, light, radio and magnetic are introduced into a defined region of water depending upon the particular species of animal to be affected and that species' predicted reaction to the selected stimulus. The system uses a feedback monitor and computer to monitor the species' response to the stimuli and to adapt the stimuli to changing species and conditions.

SUMMARY OF THE INVENTION

The present invention is an acoustic deterrent system and a method for repelling marine mammals from a region of water such as the water around, fish pens at a fish farm. The system of the invention has circuitry including transmission and control circuitry which drives acoustic transducers located beneath the surface of the region of water. The acoustic transducers deliver periodic bursts of high-frequency pulsed acoustic signals preferably at between about 7 and 10 kHz into the water under the fish pens.

When the system first begins to operate, the sound pressure level of the signals is very low. As the bursts continue to be transmitted, the level of the signals is gradually or incrementally increased, thus causing increasing discomfort to marine mammals close to the fish pens. Eventually, the power of the signals is increased beyond the threshold of pain of the mammals in the area, causing them to swim away from the pens. Since sound pressure level decreases in proportion to the square of the distance from the transducers, as the mammals swim away, the discomfort diminishes. The power level of the drive signals to the transducers continues to increase, causing the mammals to swim further away. Finally, the signal reaches a maximum power level where it is maintained to keep the mammals at a maximum distance from the pens. If they try to swim closer to the pens, the acoustic signals will cause enough pain to repel them.

In one embodiment, the system increases the power level from minimum to maximum at a very slow gradual rate. In this embodiment, the duration of the ramp-up period is approximately 30 seconds. In another embodiment, the power level is increased in steps at a very slow rate. In either case, the mammals are allowed sufficient time to swim away from the area before the power level increases to a level which may cause permanent damage to their hearing. Thus, the invention provides a humane method of repelling the mammals. In addition, if the animals' hearing was destroyed, an acoustic deterrent device would no longer have any effect in keeping them away. The system protects the animals' hearing so that acoustic deterrence will continue to be effective against them.

The ramp-up or step-up feature of the invention also provides protection for human divers at fish farms who swim near the fish pens to maintain them. If an acoustic deterrent system is activated at full power while a human is nearby, his hearing might be permanently damaged or destroyed, despite the fact that humans' hearing is much less efficient than sea mammals' hearing under water, and therefore the chance of damaging a human's hearing is much less than the chance of damaging a sea mammal's hearing. Because the deterrent system of the present invention begins operating at low power, when it first comes on, a diver in the area will hear it at a safe sound pressure level and be able to swim to the surface before the power increases to a possibly dangerous level.

In one embodiment of the invention, multiple transducers, preferably four, are located in the region. Control circuitry sequences the drive signal to the transducers so that acoustic signals are output from one transducer at a time in sequence.

This reduces the duty cycle of the driver circuits and transducers of the system. Also, the spatial distribution combined with the time sequencing of the signal sources acts as an additional irritant in repelling the mammals from the region.

In the preferred embodiment of the invention, power is supplied to the system by battery. The battery is continuously charged by a solar charging system. Other charging systems such as gas generator or wind generator can also be used. Because of the constant charging, the system can run continuously to keep the mammals away at a safe distance. If the system had to be shut down to charge or change batteries, the mammals could return to the fish pens.

The present invention has advantages over other marine mammal deterrent methods. It is non-lethal and humane. It is safe for both the marine mammals and the humans at the fish farms.

The present invention also has particular advantages over other prior acoustic deterrent systems. The present invention transmits signals at very high sound pressure level which at close ranges is believed to exceed the threshold of pain for the mammals preying on the fish in the pens. Prior systems which transmitted high frequency signals did so at low sound pressure levels. The signals of the prior systems acted merely as an irritant to the predator mammals. Accordingly, after time, the mammals grew accustomed to the signals such that they were no longer repelled from the pens. In contrast, in the present invention, the signals are more than a mere irritant to the mammals; they cause pain if the animals get close enough to the transducers. Pain will be much more difficult to become accustomed to than the irritation provided by prior systems. Consequently, the present invention serves as a much more effective deterrent.

Also, the sound output in the preferred frequency range is beyond the sensory ability of the fish and does not disturb them.

BRIEF DESCRIPTION OF THE DRAWINGS

The foregoing and other objects, features and advantages of the invention will be apparent from the following more particular description of preferred embodiments of the invention, as illustrated in the accompanying drawings in which like reference characters refer to the same parts throughout the different views. The drawings are not necessarily to scale, emphasis instead being placed upon illustrating the principles of the invention.

DETAILED DESCRIPTION OF THE INVENTION

Figure 1:
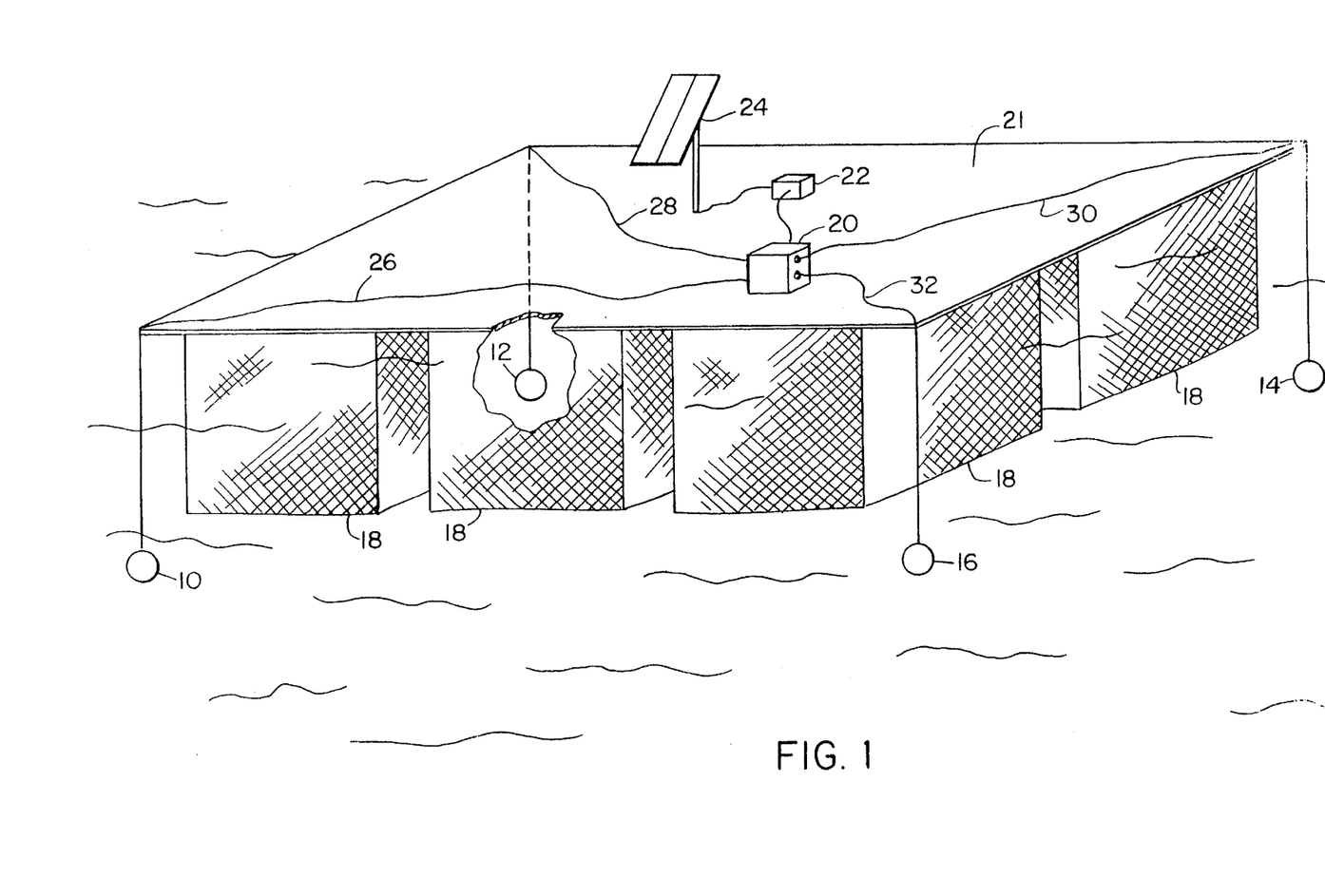
FIG. 1 is a schematic partially cut away illustration of a fish farm using the acoustic deterrent system of the present invention.

FIG. 1 schematically illustrates a fish farm using the acoustic deterrent system of the present invention. The system shown comprises four acoustic transducers 10, 12, 14 and 16 suspended beneath the underwater fish pens 18. (The figure is partially cut away to show transducer 12.) The circuitry unit 20 for the system is located on the top surface 21 of the fish pens above the surface of the water. The circuitry 20 is powered by a battery 22 which is Shown connected to solar charging system 24. The circuitry 20 transmits transducer drive signals to transducers 10, 12, 14 and 16 via cables 26, 28, 30 and 32, respectively.

When the system is operating, each of the transducers successively transmits a pulsed high-frequency acoustic signal or burst. For example, transducer 10 will transmit a 2.5 second pulsed burst. Some preset time later, transducer 12 will transmit its own 2.5 second burst, then, after another preset delay, transducer 14 transmits a burst, and, after another delay, transducer 16 transmits its burst. The sequence will then repeat beginning again with transducer 10.

The time interval or delay between bursts can be set by the user according to the deterrence effect desired. When the system is first turned on, it is desirable to set the bursts close together to maximize the deterrent effect. After the mammals have been repelled to the maximum distance, it is often desirable to extend the time period between bursts to save power by reducing the duty cycle of the signal transmissions. Typically, shortly after the system begins operating, the interval is set to about 2 seconds. After a long time of operation when the mammals have been repelled to their maximum distance, the interval is extended to about 6 seconds. This has been shown to be sufficient to maintain the deterrence effect of the system.

Figure 2:
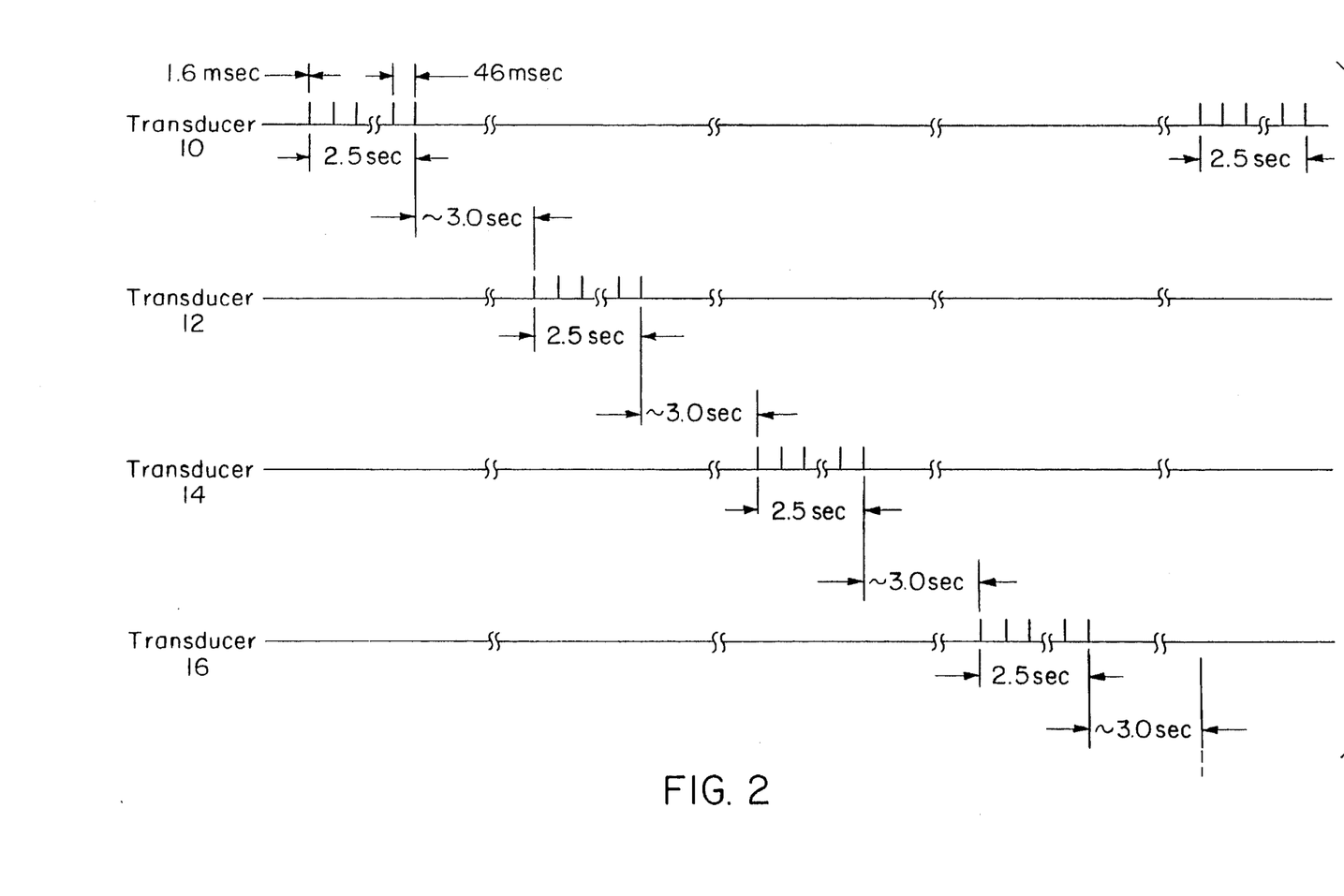
FIG. 2 is a schematic timing diagram illustrating the timing of the acoustic signals produced by the present invention.

FIG. 2 is a schematic timing diagram which illustrates the timing of the acoustic signal transmissions of the system. One timing curve is shown for each of the four transducers 10, 12, 14, 16. As previously described, each of the transducers in turn transmits a 2.5-second pulsed acoustic signal burst. Each burst consists of a series of pulses separated by another adjustable time delay. In the preferred embodiment, this delay is approximately 46 milliseconds. Each pulse represents transmission of 16 periods of a signal having a frequency between about 7 and 10 kHz into the water by the acoustic transducer. Therefore, the pulse duration is between about 1.6 and 2.3 milliseconds.

As shown in FIG. 2, after the transducer 10 burst, there is an adjustable delay before the transducer 12 burst. In the figure, this delay is shown set at approximately 3 seconds. After the delay, transducer 12 outputs its burst. Then, after another 3-second delay, transducer 14 outputs its burst. Transducer 16 outputs a burst after another 3 seconds to end the first cycle of burst transmissions. A second cycle begins again at transducer 10 after another 3-second delay.

Figure 3A:
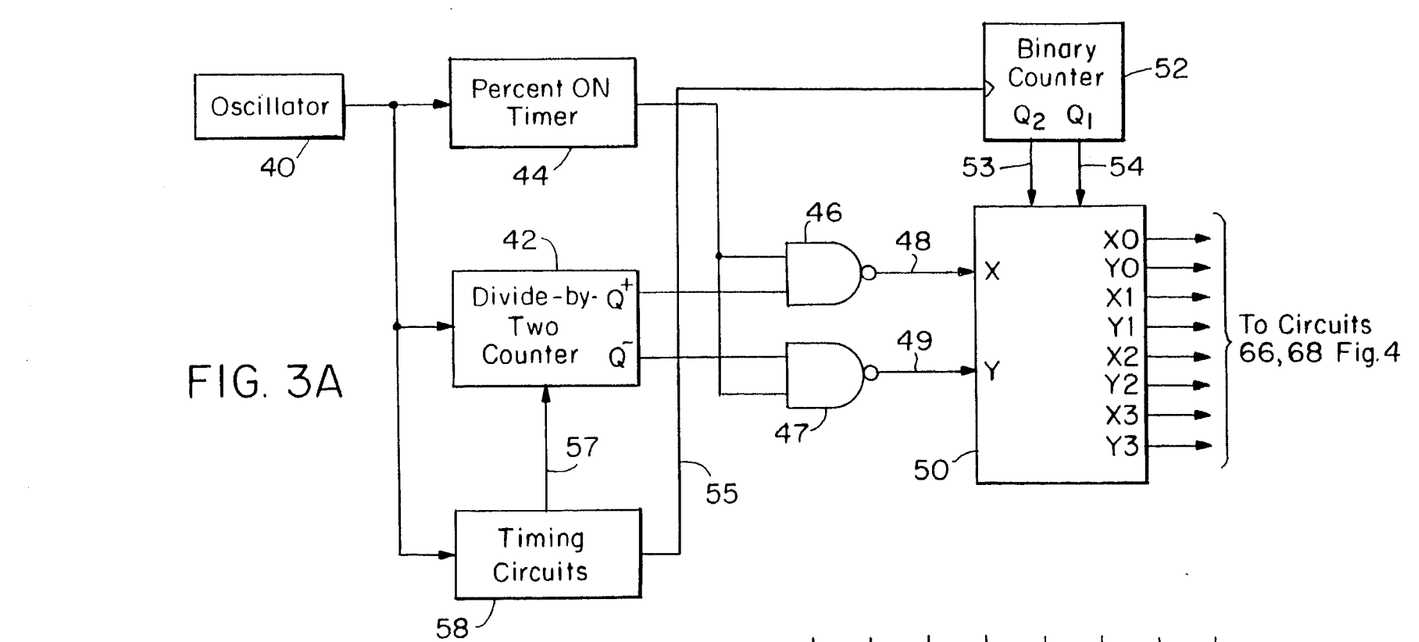
FIG. 3A is a detailed schematic block diagram of the circuitry which produces the timing for the acoustic signals of the present invention.
Figure 3B:
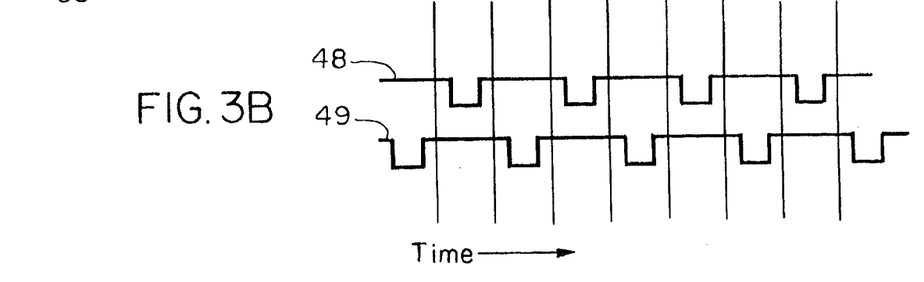
FIG. 3B is a schematic timing diagram of signals produced by the circuitry of FIG. 3A.

FIG. 3A is a detailed schematic block diagram of circuitry used to create the logic signals which control the timing shown in FIG. 2. An oscillator 40 generates a signal at twice the frequency of the acoustic signal to be transmitted. In a preferred embodiment, this signal is between about 14 and 20 kHz since the acoustic signal is between about 7 and 10 kHz. The 14–20 kHz signal is applied to a divide-by-two counter 42 and a percent-ON timer circuit 44. Timer circuit 44 is used to alter the duty cycle or on time of the 14–20 kHz signal. The 14–20 kHz signal out of the percent-ON timer 44 and the 7–10 kHz signal out of the divide-by-two counter 42 are applied to NAND gates 46 and 47 as shown. The NAND gates 46 and 47 generate the output signals 48 and 49 respectively. FIG. 3B shows the relative timing of the signals 48 and 49. It should be noted that the signals are generated such that they are never in an active (low) state simultaneously.

The signals 48 and 49 are applied to the X and Y signal inputs, respectively, of a demultiplexer circuit 50. The signals 48 and 49 appear at a pair of outputs of the demultiplexer 50 determined by the condition of select lines 53 and 54 which are driven by binary counter 52. The counter 52 increments in binary when it is clocked by a signal on line 55 which is generated by a timer within timing circuits 58. This clock signal sets the time between acoustic signal bursts described above in connection with FIG. 2. The delay of the timer is set by the user depending upon the rate at which it is desired to sequence through the multiple transducers of the system.

In one embodiment, with 2.5-second signal bursts and 3-second delays between the bursts, the timing circuits 58 will output a periodic clock signal on line 55 having a period of 5.5 seconds. Since this signal at line 55 is connected to the clock input of the binary counter 52, the count encoded on lines 53 and 54 will increment every 5.5 seconds. Therefore, the output signals 48 and 49 from NAND gates 46 and 47 will sequence through the pairs of demultiplexer outputs X0, Y0 through X3, Y3 every 22 seconds. When the count encoded by lines 53 and 54 is zero, the signals 48 and 49 will appear at outputs X0 and Y0, respectively. 5.5 seconds later the count on lines 53 and 54 will increment, and the signals 48 and 49 will appear at outputs X1 and Y1, respectively. 5.5 seconds later the signals will appear at X2 and Y2, and 5.5 seconds after that they will appear at X3 and Y3. 5.5 seconds later, the outputs will again appear at outputs X0 and Y0.

The demultiplexer outputs are applied to driver circuits used to drive the acoustic transducers. The driver circuits of one embodiment will be described below in detail in connection with FIG. 4. In another embodiment, the signals are used to drive an alternative set of driver circuits. These are described below in detail in connection with FIGS. 6A–6E.

The 14–20 kHz signal from oscillator 40 is also applied to timing circuits 58. These timing circuits 58 are used to create the 46 millisecond delay period between pulses within a burst and also to limit the duration of a burst to 2.5 seconds. These aspects of signal timing are described in detail above in connection with FIG. 2. Control outputs from the timing circuits 58 indicated generally as reference numeral 57 controllably inhibit the output of the divide-by-two counter 42 such that when the acoustic transducers are not required to transmit acoustic signals, no timing signals 48 and 49 appear at the demultiplexer 50 inputs. This creates the 46-millisecond dead spaces between pulses in a burst and also the 3.0-second time delay between bursts. While the divide-by-two counter 42 is inhibited, since no timing signals 48 and 49 appear at the demultiplexer 50 inputs, no drive signals are provided to the acoustic transducers, and the transducers do not transmit.

Figure 4:
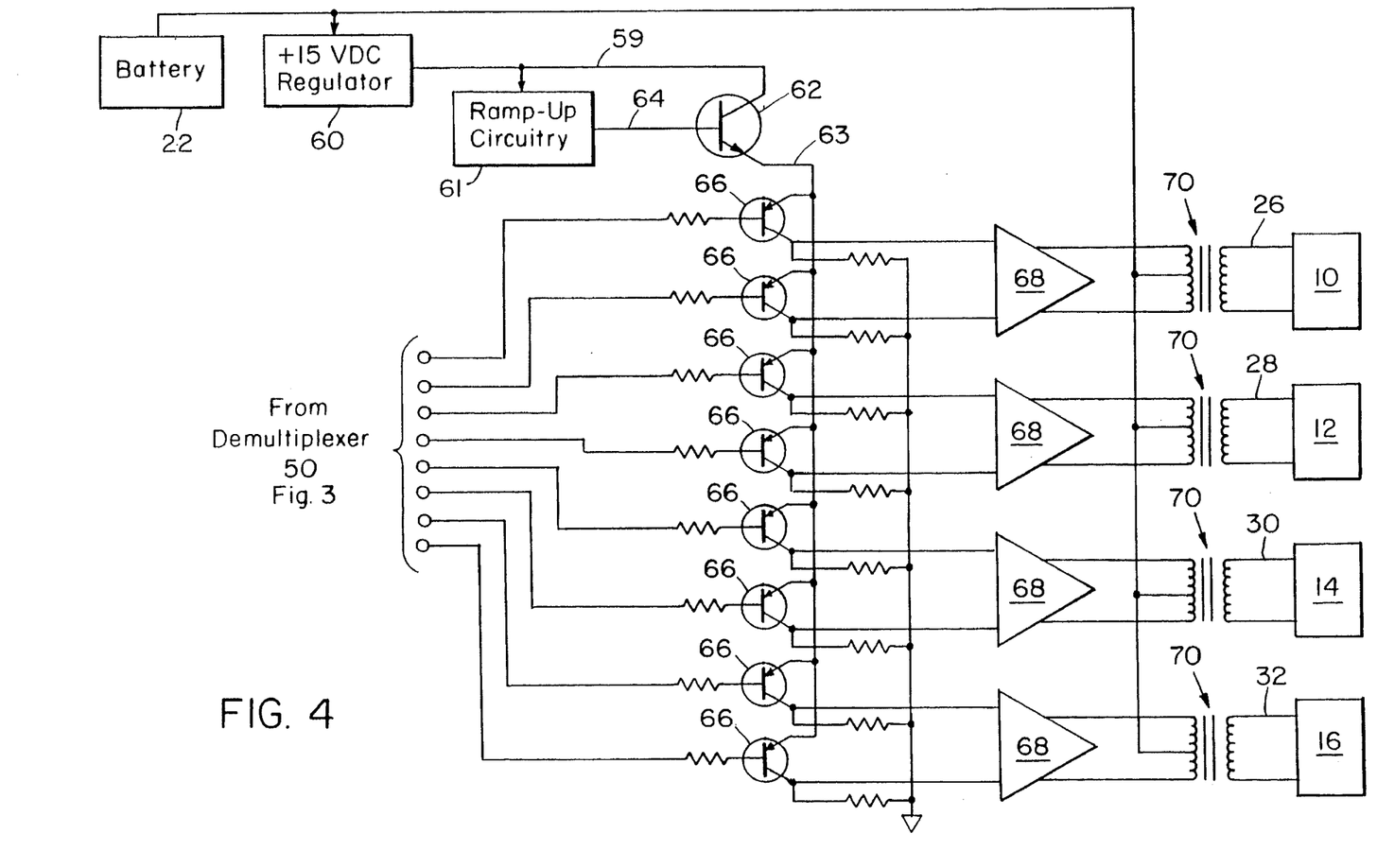
FIG. 4 is a detailed schematic block diagram of the power circuitry which drives the acoustic transducers in one embodiment of the present invention.

FIG. 4 is a detailed block diagram of the power drive circuitry of one embodiment of the invention. A battery 22 provides 20–34 VDC to a +15 VDC regulator 60. The +15 VDC regulated output 59 of the regulator 60 is applied to the collector of an emitter follower transistor 62. The output signal at the emitter 63 of transistor 62 follows the input signal at the base 64 of the transistor 62. The input signal is used to control the power delivered to the acoustic transducers 10, 12, 14, 16. In this embodiment, it is this signal which is gradually increased when the system is turned on to provide the ramp-up feature of the invention. The details of the circuitry 61 which generates the ramp-up drive signal at the base 64 of transistor 62 will be described below in detail in connection with FIG. 5A.

The emitter 63 is connected to the emitters of eight PNP transistors 66. The signal at 63 is selectively gated through the transistors 66 by the output signals from the demultiplexer circuit 50 described above in connection with FIG. 3A. The outputs of the transistors 66 are applied to push-pull amplifier circuits 68. The outputs of the push-pull amplifier circuits 68 are further amplified by transformers 70. The outputs of the transformers are connected via cables 26, 28, 30, 32 to acoustic transducers 10, 12, 14, 16, respectively.

FIG. 4 shows that the state of select lines 53 and 54 (see FIG. 3A) on the demultiplexer 50 determines which acoustic transducer is activated at a particular time. If the select lines 53, 54 select outputs X0, Y0, then acoustic transducer 10 is driven. When the select lines 53, 54 change and outputs X1, Y1 are activated, transducer 12 is driven. Outputs X2, Y2 drive transducer 14, and outputs X3, Y3 drive transducer 16.

FIG. 4 also shows that the level of the signal at 64 controls the power delivered to the acoustic transducers. As the level of the signal at 64 is increased, the level of the signal at 63 also increases. A higher-level signal is delivered to push-pull amplifiers 68 which in turn deliver more of the raw battery power through the transformers 70. In the preferred embodiment of the invention, the power circuitry is capable of delivering more than 1,000 watts RMS to the acoustic transducers during the 1.62–2.3 ms pulse at the operating frequency of approximately 7–10 kHz.

Figure 5A:
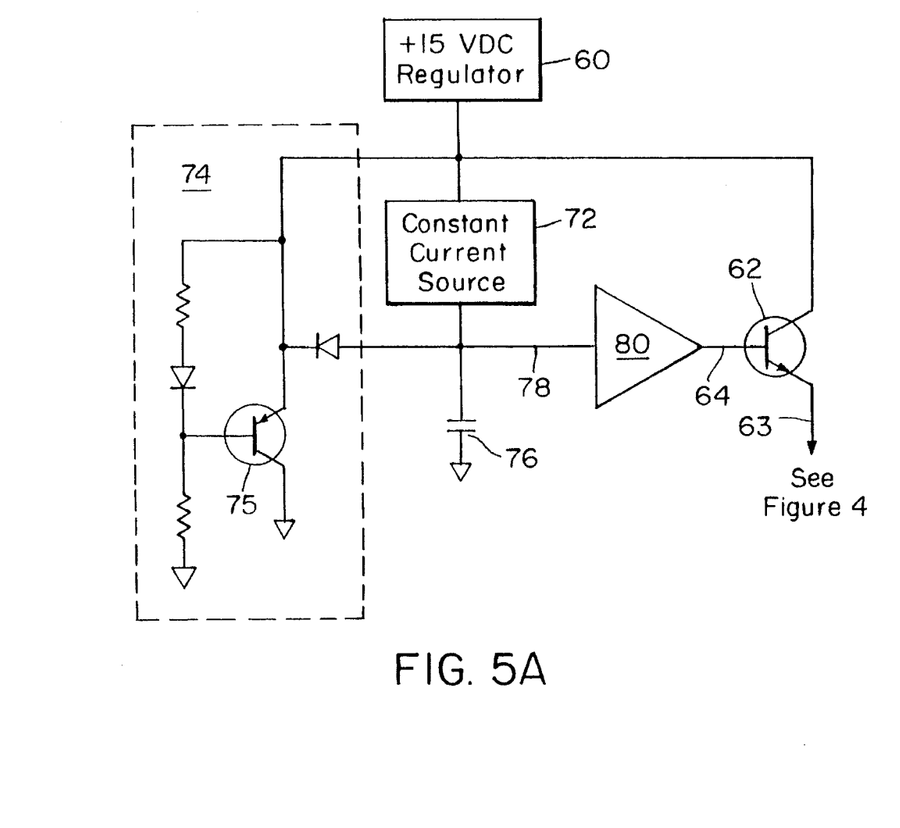
FIG. 5A is a detailed schematic block diagram of the ramp-up circuitry in the embodiment of the present invention shown in FIG. 4.

FIG. 5A is a detailed schematic block diagram of the ramp-up circuitry 61 of the embodiment of FIG. 4. The ramp-up circuitry 61 controls the level of the signal at 64 delivered to the emitter follower transistor 62. The +15 VDC regulator 60 powers a constant current source 72 (such as a National Semiconductor LM334) which delivers a constant current to gradually charge capacitor 76. In the preferred embodiment, the current source 72 provides approximately 120 microamps of current, and the capacitor fully charges in approximately 30 seconds.

Figure 5B:
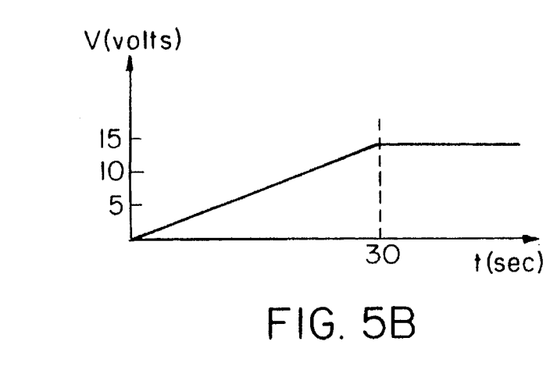
FIGS. 5B and 5C schematically depict signals produced by the ramp-up circuitry in the embodiment of the present invention shown in FIG. 4.
Figure 5C:
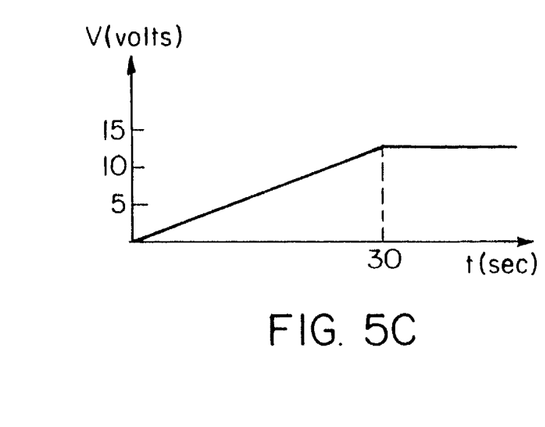

As the capacitor 76 charges, a signal at 78 (see FIG. 5B) of linearly increasing voltage level is applied to the input of a high-impedance linear amplifier 80 having a small voltage gain. As the voltage level of signal 78 increases, so does the level of the signal at 64 at the base of the emitter follower transistor 62. Therefore, the signal at 63 (see FIG. 5C) delivered to transistors 66 gradually increases and, consequently, so do the power delivered to the acoustic transducers and the sound pressure level of the acoustic signals produced. The ramp-up signals at 78 and the resulting signal at 63 are shown in FIGS. 5B and 5C, respectively.

It should be noted that other methods of charging capacitor 76 are possible. For example, the capacitor could be charged through a resistor. However, the linear ramp provided by the constant current source is preferable over the logarithmic ramp provided when the capacitor is charged through a resistor. The capacitor could also be charged by a staircase voltage rising in steps controlled by digital logic including a digital-to-analog converter.

When the acoustic deterrent system is temporarily shut down, it is desirable to reactivate the system at low power and begin ramping up again. This requires that capacitor 76 be discharged before reapplying power to the system. If the system is shut down only briefly, the capacitor 76 may not discharge in time, and the system will be reactivated at a high power level. The present invention provides a discharge circuit 74 for discharging the capacitor 76 immediately upon power shut down. When the power is shut off, the output of the regulator 60 drops to zero almost immediately. As can be seen in FIG. 5A, when this occurs, the capacitor 76 will discharge through transistor 75.

Figure 6A:
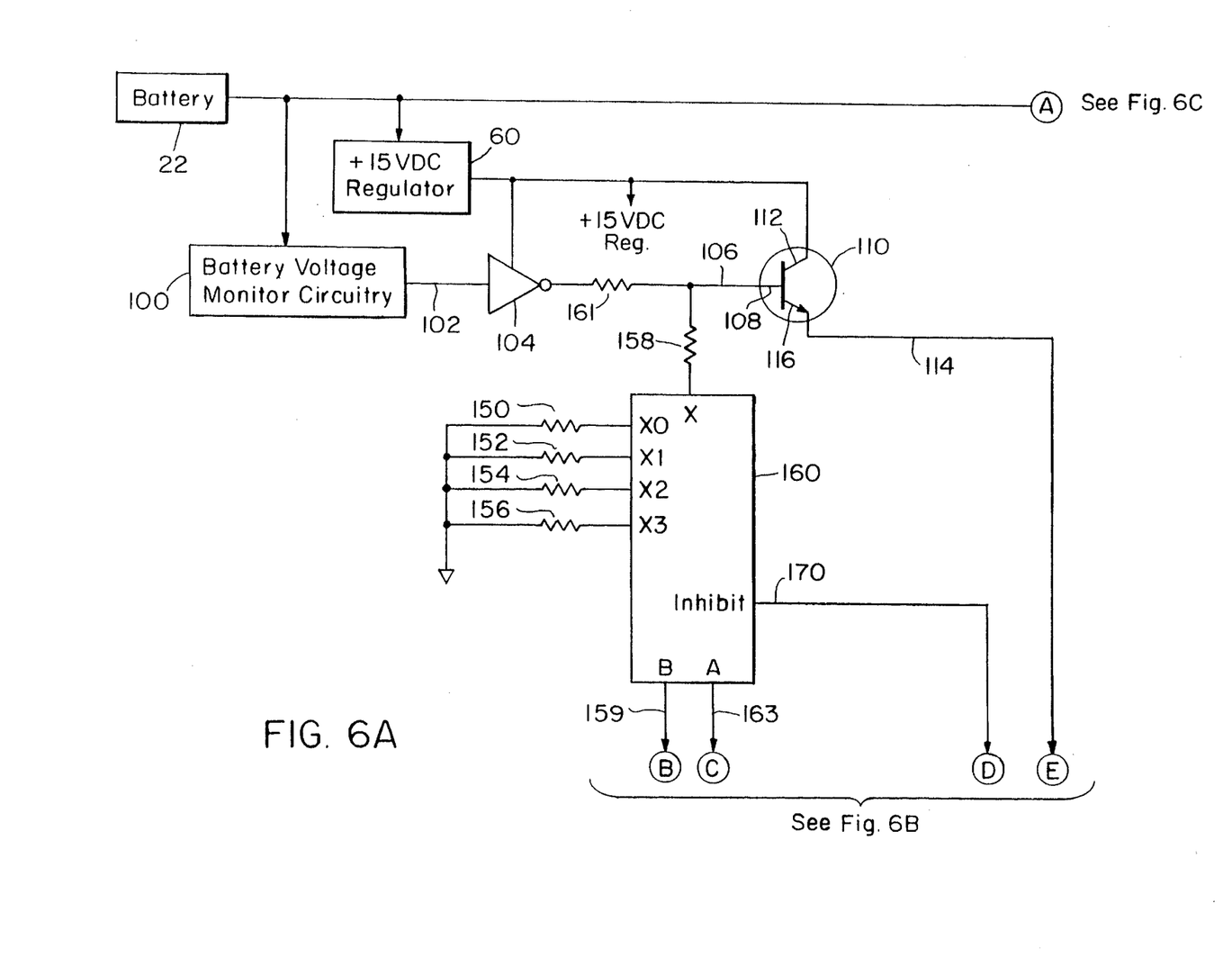
FIGS. 6A–6C contain a detailed schematic block diagram of timing and drive circuitry of an alternative embodiment of the invention.
Figure 6B:
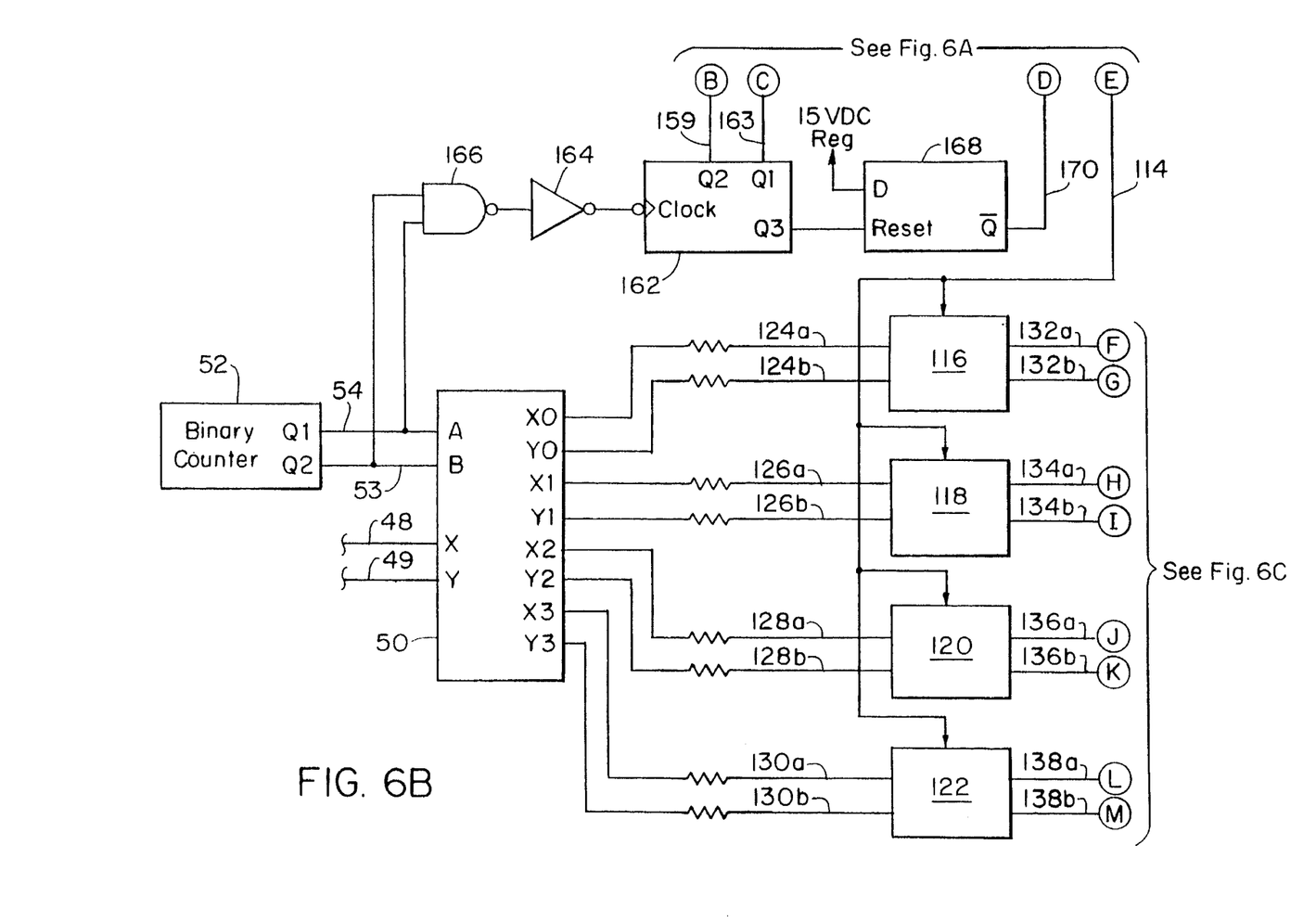
Figure 6C:
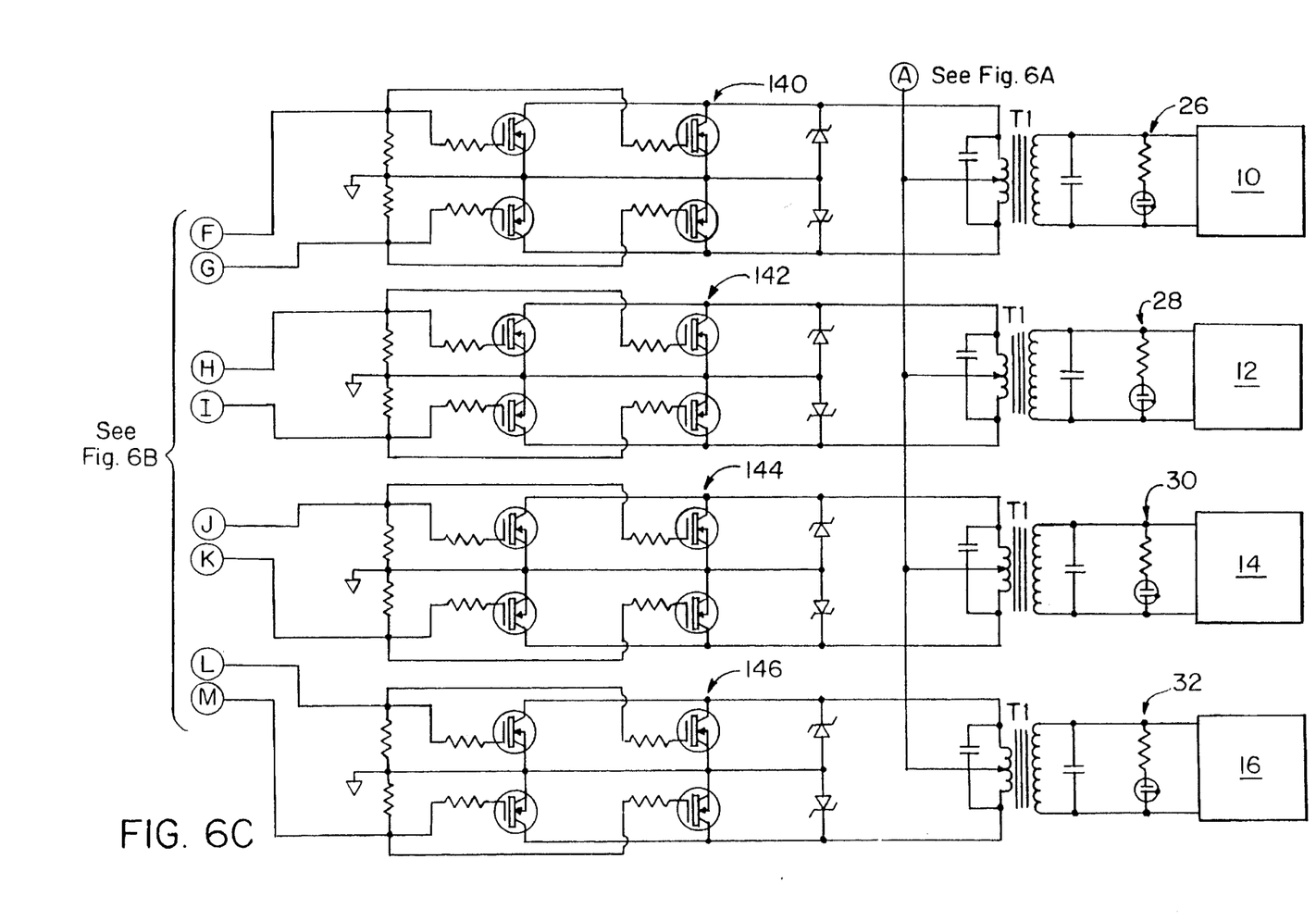

In an alternative embodiment of the invention, the ramp-up or step-up feature of the invention is not provided by charging a capacitor with a constant current source. FIGS. 6A–6C contain a detailed schematic block diagram of control and driving circuitry of this alternative embodiment.

As shown in FIG. 6B, the same binary counter 52 as described above in connection with FIG. 3A is used via control output lines 53 and 54 to sequentially activate the output lines of demultiplexer circuit 50. Depending on the states of lines 53 and 54, the timing signals 48 and 49, generated as described in detail above, are routed to a selected pair of demultiplexer outputs X0, Y0 through X3, Y3. The signals on lines 48 and 49 are generated in the same fashion as described above in connection with FIG. 3A, and they have the same waveforms as shown in FIG. 3B. Further, the circuitry of this alternative embodiment generates the same pattern of acoustic signal timing as shown in the timing diagram of FIG. 2.

As in the previously described embodiment, the battery 22 provides a DC voltage of between +20 and +34 volts to a +15 VDC regulator 60 which provides a regulated +15 VDC output. The output voltage from the battery is also monitored by battery voltage monitor circuitry 100. If the battery voltage is above a predetermined threshold, preferably +20 VDC, a low voltage signal, approximately 0 VDC, appears on line 102. The low voltage signal is inverted by driving inverter 104 such that a non-zero voltage signal appears on line 106.

The signal on line 106 is used to drive the base 108 of an emitter follower transistor 110. The collector 112 of the transistor 110 is connected to the regulated +15 VDC output of the regulator 60. As an emitter follower 110, the level of the signal at the emitter 116 follows the level of the base drive signal applied to the base 108. Thus, the signal at 106 controls the level of the signal at line 114. Line 114 is connected to the supply input of each of four power MOSFET driver circuits 116, 118, 120, 122. These can be MAX626 integrated circuits sold by Maxim Integrated Products or their equivalents. They are drivers which are specifically designed to drive the large input capacitance of power MOSFETs used in the amplification circuits of the invention. Besides the supply inputs, each of the power MOSFET drivers 116, 118, 120, 122 has two inputs from demultiplexer circuit 50 and two outputs. Each pair of outputs forms the input to a corresponding acoustic transducer drive circuit 140, 142, 144, 146. Each transducer drive circuit 140, 142, 144, 146 drives a single corresponding acoustic transducer 10, 12, 14, 16.

The amount of drive power provided by each power MOSFET driver circuit 116, 118, 120, 122 is determined by the level of its supply voltage. Thus, the higher the supply voltage on line 114, the higher the drive power provided to the transducer drive circuits 140, 142, 144, 146 and, consequently, the higher the sound pressure level of the signals emitted by the acoustic transducers 10, 12, 14, 16. Therefore, adjusting the level of the signal at 106 will vary the level of the acoustic signal.

The signal level at 106 can be controlled by selectively connecting one of resistors 150, 152, 154 and 156 in series with resistor 158 through muliplexer/demultiplexer circuit 160. The voltage level at 106 is determined by the voltage divider set up by resistor 161 and the series resister connection across circuit 160. The resistance of resistors 150, 152, 154 and 156 increases in the order of increasing reference numeral. That is, R(150)<R(152)<R(154)<R(156). Therefore, it can be seen that as the resistors 150, 152, 154, 156 are connected in sequence beginning with resistor 150, the voltage at 106 increases in steps. When none of the four resistors is connected, the series connection across circuit 160 is an open circuit. In this case, the transistor 110 is driven into saturation and the voltage level at line 114 is close to the supply voltage level, approximately +14.5 VDC.

The one of the resistors 150, 152, 154, 156 connected across multiplexer/demultiplexer circuit 160 to resistor 158 is determined by the states of the select lines A and B of circuit 160. When BA=00, X is connected to X0, and, therefore, resistor 158 is connected to resistor 150. When BA=01, resistor 158 is connected to resistor 152; when BA=10, resistor 158 is connected to resistor 154; and when BA=11, resistor 158 is connected to resistor 156. The states of select lines A and B of multiplxer/demultiplexer circuit 160 are determined by the Q1 and Q2 outputs of a binary counter 162 (see FIG. 6C) connected via lines 163, 159. The Q1 output of the counter 162 is the least significant bit of the count stored in the counter 162; Q2 is the second least significant bit; and Q3 is the third least significant bit. On each negative edge of the clock input to counter 162, the counter 162 increments in binary. The clock input to the counter 162 is obtained via NAND gate 166 and inverter 164 from the Q1 and Q2 outputs of binary counter 52, previously described in connection with FIG. 3A.

As previously described, binary counter 52 controls cycling the logic signals on lines 48 and 49 through each of the transducer driving circuits one at a time. Lines 53 and 54 from the binary counter 52 increment in binary at a certain adjustable predetermined frequency determined by the duration of an acoustic signal burst and the time delay between bursts. In the embodiments described herein, each burst is 2.5 seconds long and the delay between bursts is selected to be approximately 3.0 seconds. Therefore, the count on lines 53 and 54 increments every 5.5 seconds. The binary counter 162 receives a negative-going clock edge and increments its count whenever the state of lines 53 and 54 changes from 11 to 00. This will happen each time the demultiplexer circuit 50 has made a complete cycle through all four pairs of outputs X0, Y0 through X3, Y3.

When the system is first powered up, lines 53 and 54 are in the 00 state. The Q1 and Q2 outputs of binary counter 162 on lines 163 and 159 are also 00. Also, the Q̄ output of D flip-flow 168 on line 170 is in a 0 state. Since the select inputs AB to the multiplexer/demultiplexer circuit 160 are in the 00 state, resistor 158 is connected in series to resistor 150, and the voltage level at 106 is in its lowest possible state. Therefore, the supply voltage on line 114 to the power MOSFET drivers 116, 118, 120, 122 is at its lowest level. As a result, the sound pressure level of the signals emitted by acoustic transducers 10, 12, 14, 16 are at a low start-up level.

With lines 53 and 54 in the 00 state, the signals on lines 48 and 49 pass through to the X0 and Y0 outputs of demultiplexer circuit 50. These signals on lines 124a and 124b are amplified by MOSFET driver 116. The resulting output signals 132a and 132b are input to driving circuit 140 which further amplifies them. The final amplified signal is connected to and drives acoustic transducer 10 via cable 26.

After approximately 5.5 seconds the state of lines 53 and 54 changes to 01. The timing signals on lines 48 and 49 now appear at outputs X1, Y1 of demultiplexer 50. This change of states does not effect the clock signal to counter 162; therefore, the power level of the output signal remains the same. The signals on lines 126a and 126b are amplified by MOSFET driver 118. The output signal on lines 134a and 134b is amplified by amplifier circuits 142. The final driving signal is coupled to acoustic transducer 12 by cable 28. After another 5.5 seconds, the state of lines 53 and 54 changes to 10. The signals on lines 48 and 49 are output from demultiplexer circuit 50 at the X2, Y2 outputs to lines 128a and 128b. MOSFET driver 120 amplifies the input signal and outputs an amplified signal on lines 136a and 136b. Amplifier circuits 144 further amplify the signal and cable 30 couples the driving signal to acoustic transducer 14. After a third 5.5 second period, the state of lines 53 and 54 changes to 11. The clock signal to counter 162 changes to a high state, but the state of counter 162 does not change yet since there has been no negative edge of the clock signal. The signals on lines 48 and 49 are output by the demultiplexer 50 to lines 130a and 130b via outputs X3, Y3. MOSFET driver 122 emits an amplified signal to lines 138a and 138b. The signal is further amplified by amplifier circuits 146 and is coupled to acoustic transducer 16 by cable 32.

After another 5.5 second period, the state of lines 53 and 54 changes to 00. At this point, counter 162 receives a negative-going clock edge which changes the state of the Q2, Q1 outputs on lines 159, 163 to 01. The BA select lines to multiplexing/demultiplexer circuit 160 now connect X to X1, and therefore, resistor 158 to resistor 152. The voltage level at 106 increases, causing a corresponding increase in power delivered to the acoustic transducers 10, 12, 14, 16 and an increase in acoustic signal sound pressure level. The signals at lines 48 and 49 again cycle through the outputs X0, Y0 through X3, Y3 of the demultiplexer 50, and an acoustic signal burst is emitted by each acoustic transducer 10, 12, 14, 16 at the new higher power level.

After this second cycle is completed, the Q1, Q2 outputs of counter 162 again increment and cause resistor 158 to be connected in series to resistor 154. This brings the power delivered to the acoustic transducers 10, 12, 14, 16 to a third higher power level. The cycle repeats with each transducer emitting an acoustic burst at the third power level. When the Q2, Q1 outputs of the counter 162 reach the 11 state, resistor 158 is connected to resistor 156, and the cycle is completed at the fourth power level. At the end of the fourth cycle, the state of lines 53, 54 changes from 11 to 00. The counter 162 receives a negative-going clock signal which increments the counter 162. The Q2, Q1 outputs change the to the 00 state, but output Q3 changes from the 0 state to the 1 state. This resets D flip-flop 168, causing line 170 to change from a low state to a high state. The multiplexer/demultiplexer 160 is thus inhibited and therefore presents an open circuit between resistor 158 and ground. The transistor 110 is driven into the saturation state, and the signal at line 114 reaches a maximum value of approximately +14.5 VDC. In this state, the acoustic transducers 10, 12, 14, 16 are driven with the maximum power of approximately 1,000 watts RMS to produce the maximum-sound-pressure-level acoustic signal of approximately 205 dB referenced to 1 µPa at 1 meter. As long as power is not interrupted, the system continues operating in this condition. That is, at this final constant maximum power level, the binary counter 52 continues to count to repeatedly cycle through the four acoustic transducers 10, 12, 14, 16 in sequence to keep the repelled mammals at the maximum distance from the region.

Table 1 shows the approximate sound pressure level of the acoustic signals emitted by each acoustic transducer at each of the five steps. Step 1 shows the start-up power level and step 5 shows the final constant level.

TABLE 1

| Step | Sound Pressure Level (referenced to 1 µPa @ 1 m) |
| --- | --- |
| 1 | 183.42 dB |
| 2 | 189.44 dB |
| 3 | 195.46 dB |
| 4 | 201.48 dB |
| 5 | 205 dB |

Figure 7A:
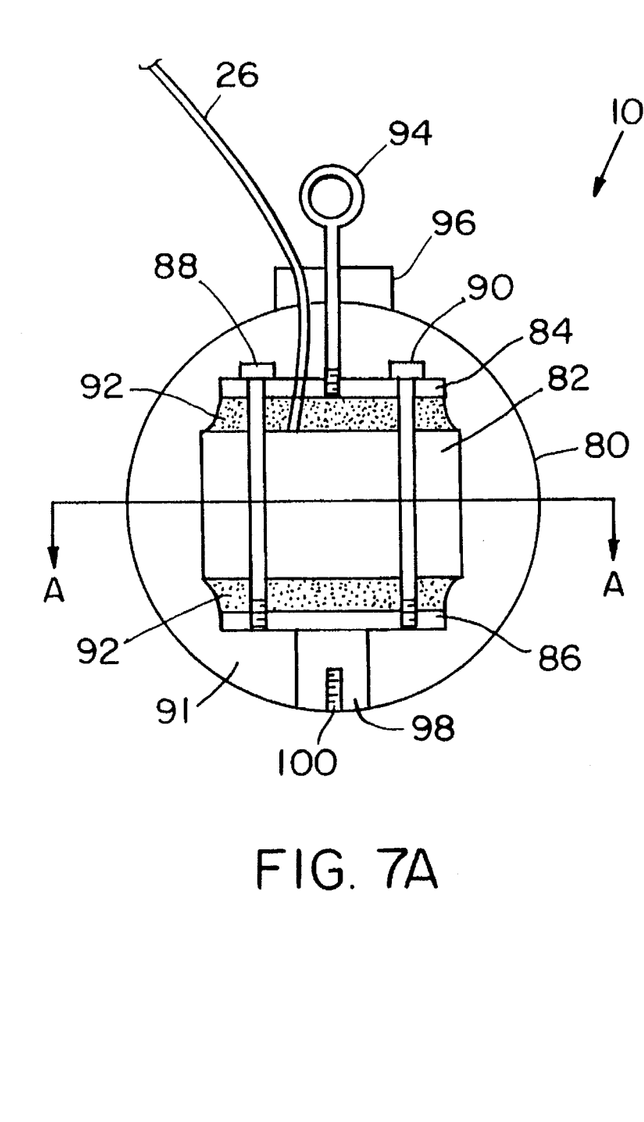
FIG. 7A is a schematic side illustration of an acoustic transducer used with the present invention.

FIG. 7A is a schematic side cross-sectional view of an omni-directional acoustic transducer 10 used in the present invention. The transducer 10 is enclosed within an outer spherical shell 80. An annular ring-shaped piezoelectric element 82 is squeezed between two plates 84 and 86 by bolts 88 and 90. The piezoelectric element 82 can also be a plurality of ring-shaped piezoelectric elements. An epoxy or urethane foam 92 is disposed between upper plate 84 and the top of the piezoelectric ring 82 and also between the bottom of the ring 82 and the bottom plate 86. This allows the ring 82 to vibrate to produce the acoustic signals.

Figure 7B:
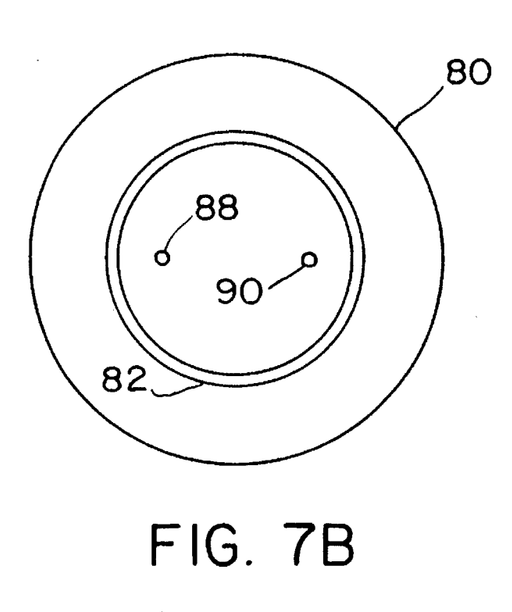
FIG. 7B is a cross-sectional view of the transducer of FIG. 7A taken along line A—A of FIG. 7A.

An eye bolt 94 passes through collar 96 to the top plate 84. The eye bolt 94 is used to hang the transducer below the fish pens. An electric cable 26 also passes through the collar 96 to deliver the drive signal to the transducer. A support shoulder 98 is attached to the bottom plate 86 and rests against the inside surface of the spherical shell 80. A threaded hole 100 in the shoulder 98 is exposed to the exterior of the shell 80. This allows stabilizing weights or cables to be threaded into the bottom of the transducer 10 to steady it in the water. The ring shape of the piezoelectric element 82 produces a torroidal signal in all directions emanating from the transducer 80. It should be noted that other shapes for the piezoelectric element can be used. FIG. 7B is a cross-sectional view of the transducer taken along line A—A of FIG. 6A, showing the piezoelectric ring 82, the bolts 88, 90 and the outer spherical shell 80.

The invention claimed is:

1. A method of repelling marine mammals from a region of water; characterized in that the method comprises the steps of:
   transmitting a plurality of animal repelling acoustic signals into the region at a sound pressure level low enough to avoid damage to the auditory systems of the marine mammals; and
   gradually or incrementally increasing the sound pressure level of successive acoustic signals from a minimum to a maximum level to gradually repel the mammals.

2. The method of claim 1 wherein the acoustic signals are generated by an acoustic transducer (10, 12, 14, 16), the maximum sound pressure level of the acoustic signals being greater than about 200 dB referenced to 1 microPascal at 1 meter.

3. The method of claim 1 wherein the sound pressure level of the acoustic signals is increased to a maximum level to repel the mammals to a maximum distance, the acoustic signals causing pain in the mammals if they approach the region to less than the maximum distance.

4. The method of claim 1 wherein the frequency of the acoustic signals is approximately 7–10 kHz.

5. The method of claim 1 wherein the acoustic signals are transmitted by a plurality of acoustic transducers (10, 12, 14, 16).

6. The method of claim 5 wherein the acoustic transducers (10, 12, 14, 16) transmit the acoustic signals one at a time in a sequence.

7. An acoustic deterrent system for repelling marine mammals from a region of water, comprising:

an acoustic transmission circuit (10, 12, 14, 16, 116, 118, 120, 122, 140, 142, 144, 146) for transmitting acoustic signals into the region of water; and a controlling circuit (60, 110, 160) generating an output signal coupled to the acoustic transmission circuit, a level of the output signal controlling the sound pressure level of the acoustic signals; characterized in that the controlling circuit comprises a plurality of resistors (150, 152, 154, 156) selectively coupled within the controlling circuit to control the level of the output signal to increase the sound pressure level of successive acoustic signals such that the marine mammals are gradually repelled from the region of water.

8. The acoustic deterrent system of claim 7 wherein the sound pressure level of the acoustic signals is increased to a maximum level to repel the marine mammals to a maximum distance, the signals causing pain in the mammals if they approach the region to less than the maximum distance.

9. The acoustic deterrent system of claim 7 wherein the frequency of the acoustic signals is approximately 7–10 kHz.

10. The acoustic deterrent system of claim 7 wherein the maximum sound pressure level of the acoustic signals is greater than about 200 dB referenced to 1 microPascal at 1 meter.

11. The acoustic deterrent system of claim 7 wherein the acoustic transmission circuit comprises a plurality of acoustic transducers (10, 12, 14, 16) for transmitting the acoustic signals.

12. The acoustic deterrent system of claim 11 wherein the acoustic transducers transmit the acoustic signals one at a time in a sequence.

13. The acoustic deterrent system of claim 7 wherein the acoustic transmission circuit provides a pulsed drive signal at approximately 1,000 watts, RMS during a pulse to an acoustic transducer to transmit acoustic signals.

14. An acoustic deterrent system for repelling marine animals from a region of water, comprising:

an acoustic transmission circuit (10, 12, 14, 16, 66, 68, 70) for transmitting acoustic signals into the region of water; and a controlling circuit (60, 61, 62) generating an output signal coupled to the acoustic transmission circuit, a level of the output signal controlling the sound pressure level of the acoustic signals;

characterized in that the controlling circuit comprises a capacitor (76) and a constant current source (72) for charging the capacitor to provide an increasing voltage across the capacitor to control the level of the output signal to increase the sound pressure level of successive acoustic signals such that the marine mammals are gradually repelled from the region of water.

15. The acoustic deterrent system of claim 14 wherein the sound pressure level of the acoustic signals is increased to a maximum level to repel the marine mammals to a maximum distance, the signals causing pain in the mammals if they approach the region to less than the maximum distance.

16. The acoustic deterrent system of claim 14 wherein the frequency of the acoustic signals is approximately 7–10 kHz.

17. The acoustic deterrent system of claim 14 wherein the maximum sound pressure level of the acoustic signals is greater than about 200 dB referenced to 1 microPascal at 1 meter.

18. The acoustic deterrent system of claim 14 wherein the acoustic transmission circuit comprises a plurality of acoustic transducers (10, 12, 14, 16) for transmitting the acoustic signals.

19. The acoustic deterrent system of claim 18 wherein the acoustic transducers transmit the acoustic signals one at a time in a sequence.

20. The acoustic deterrent system of claim 14 wherein the acoustic transmission circuit provides a pulsed drive signal at approximately 1,000 watts, RMS during a pulse to an acoustic transducer to transmit acoustic signals.

21. The acoustic deterrent system of claim 14 further comprising a discharge circuit (74) for discharging the capacitor when power is removed from the system.

\* \* \* \* \*